United States Patent [19]

Sosalla

[11] 4,121,669
[45] Oct. 24, 1978

[54] FLOATING ROW-CROP CULTIVATOR

[75] Inventor: Harry Sosalla, Sac City, Iowa

[73] Assignee: Royal Industries, Inc., Sac City, Iowa

[21] Appl. No.: 792,353

[22] Filed: Apr. 29, 1977

[51] Int. Cl.² .............................................. A01B 39/24
[52] U.S. Cl. ................................... 172/181; 172/624;
172/658; 172/509
[58] Field of Search ............... 172/624, 619, 627, 646,
172/649, 657, 658, 484, 417, 117, 508, 181

[56] References Cited

U.S. PATENT DOCUMENTS

| Re. 25,803 | 6/1965 | Lynch | 172/484 X |
|---|---|---|---|
| 2,298,537 | 10/1942 | Lyle | 172/624 |
| 3,680,648 | 8/1972 | Tonsfeldt | 172/417 X |
| 3,830,311 | 8/1974 | Bryson | 172/624 |
| 3,921,726 | 11/1975 | Connor | 172/624 |

FOREIGN PATENT DOCUMENTS

696,973 9/1953 United Kingdom ..................... 172/484

*Primary Examiner*—Richard J. Johnson
*Attorney, Agent, or Firm*—Wegner, Stellman, McCord, Wiles & Wood

[57] ABSTRACT

A row-crop cultivator for tilling the soil between adjacent rows of crops is connected to a prime mover. The cultivator includes a drawbar connected to the prime mover and a plurality of laterally adjacent cultivating gang assemblies for tilling the soil between adjacent crop rows, each is connected to the drawbar so that it travels on the ground under its own weight and moves independently in a vertical direction relative to an adjacent gang assembly. Each gang assembly has a frame coupled to the drawbar, guide means, such as a single-ribbed wheel, carried by the frame for following a path defined in the ground indicating the direction of movement for the gang assembly between adjacent crop rows, earthworking tools, such as ground-opening discs, weed cutters and spring tooth harrows, carried by the frame to loosen or break up the soil between adjacent crop rows, and bearing means, such as a roller, carried by the frame to abut corresponding cooperating bearing means, such as a vertical bearing plate, carried by an adjacent gang assembly. The ground opening discs are positioned at opposite lateral sides of the gang assembly for penetrating the ground along a line generally adjacent the respective crop rows. The discs on opposing lateral sides of adjacent gang assemblies are spaced apart to flank the crop row which passes between the adjacent gang assemblies. Each gang assembly tills soil between adjacent crop rows and is free to float with the bearing means permitting relative vertical movement between adjacent gang assemblies, but prevents relative lateral movement because of the horizontal abutment of the respective cooperating bearing means.

24 Claims, 8 Drawing Figures

FLOATING ROW-CROP CULTIVATOR

BACKGROUND OF THE INVENTION

This invention relates to an agricultural implement and, more particularly, to a floating row-crop cultivator which is attached to a prime mover, such as a tractor.

In an agricultural operation, it is of particular importance to cultivate the land to loosen or break up the soil about growing crops for the purpose of killing weeds and modifying the moisture retention of the soil. Many crops such as sugar beets, soy beans and the like, are planted in very strict, straight rows. Typically a cultivator is operated along the rows to till the ground between adjacent crop rows, which, in the case of sugar beets, are approximately 22 inches apart, but may be closer together or farther apart depending on specific agricultural conditions.

One particular problem associated with sugar beets and similar crops is that the seed does not have a high rate of germination. As a result, the seed must be planted in excess of the number of plants that are desired to obtain a sufficient yield. Oftentimes, however, two or more plants come up too close together. In the case of sugar beets, which can grow to be quite large, 10 to 12 inches in girth, the plants must then be thinned out so that there is enough space for adequate growth.

When germination of the sugar beets has occurred, a cultivator is operated between the rows of crop to mulch the soil between the rows and eliminate the weeds there-between, especially those weeds growing close to the row of small beets. To permit rapid thinning of the plants, the cultivator when operated also leaves an uncultivated block of soil projecting upward from the general field level where the seeds are growing. Thereafter, a manual laborer working with a garden hoe or the like can thin the plants by dragging the hoe laterally through the block. The narrower the block left by the cultivator, the quicker and easier it is for the laborer to draw the hoe through the block to thin the crop. Since a thin block permits the laborer to do more work, a cultivator which operates to leave narrow blocks for the crop is desirable in that productivity of the laborer is increased because more acres can be thinned in a given length of time. This is especially important in the case of sugar beets where the field should be cultivated a minimum of three times.

Row-crop cultivators presently employed have to be operated at a relatively low speed to achieve thin blocks of soil. In the case of sugar beets, these blocks are preferably about 1¾ inches wide and ¾ to 1 inch high. To achieve this configuration for the soil block, the tractor, when using a conventional row-crop cultivator, can only operate at a speed of between approximately ¾ and 1¼ miles per hour. Otherwise, the cultivator has a tendency to operate erratically whereby the cultivator moves laterally relative to the crop rows and either makes the blocks too large or cuts through the blocks and destroys the crop.

SUMMARY OF THE INVENTION

It is the principal object of the invention to provide a row-crop cultivator which can be operated at a greater speed so as to increase productivity while maintaining or improving the uniformity of the resulting crop rows.

It is a further object of the invention to provide a row-crop cultivator having a plurality of laterally adjacent cultivating gang assemblies each of which cultivate the ground between adjacent crop rows and float independently in a vertical direction relative to the other gang assemblies so as to follow the contour of the ground. The individual gang assemblies are laterally stabilized so that the tendency for the gang assemblies to move sideways when an object, such as a rock or stump, is struck is alleviated.

In accordance with the invention, a floating row-crop cultivator is seen to include a plurality of laterally adjacent cultivator gang assemblies which are independently pivotally secured to a drawbar assembly which, in turn, is towed by a tractor. Bearing means are provided on adjacent gang assemblies so that cooperation therebetween prevents relative lateral movement between adjacent gang assemblies. Hence, each gang assembly can float independently on the ground to follow the contour thereof, while the gang assemblies are laterally stabilized and move together thereby substantially minimizing lateral movement.

The bearing means includes a bearing plate having a vertical bearing surface carried by one gang assembly and a roller carried by an adjacent gang assembly. The bearing means being mounted to span the distance between the adjacent gang assemblies thereby also spanning the crop row so that the roller engages the bearing surface and rolls upwardly and downwardly thereon. The abutment of the roller and the bearing surface prevents relative lateral movement of the one gang assembly toward the adjacent gang assembly.

In an exemplary embodiment of the invention, each gang assembly has a frame assembly attached to a drawbar by a linkage assembly, a plurality of earthworking tools carried on the frame assembly including rotatable discs at each side of the gang assembly to open the ground adjacent adjoining crop rows, weed cutters to sever weeds adjacent the crop rows and spring tooth harrows for loosening and breaking up the ground between the rows, and a shield at each side to prevent soil from being thrown on the crops between adjacent gang assemblies.

In a preferred embodiment of the invention, the gang assemblies are releasably secured to the drawbar assembly so that the implement may be adapted to operate in fields in which the crop rows have different spacing. The earthworking tools and the bearing means are adjustably secured to the frame assembly to permit the gang assemblies to be configured to operate at various row widths.

DESCRIPTION OF THE PREFERRED EMBODIMENTS

Figure 1:
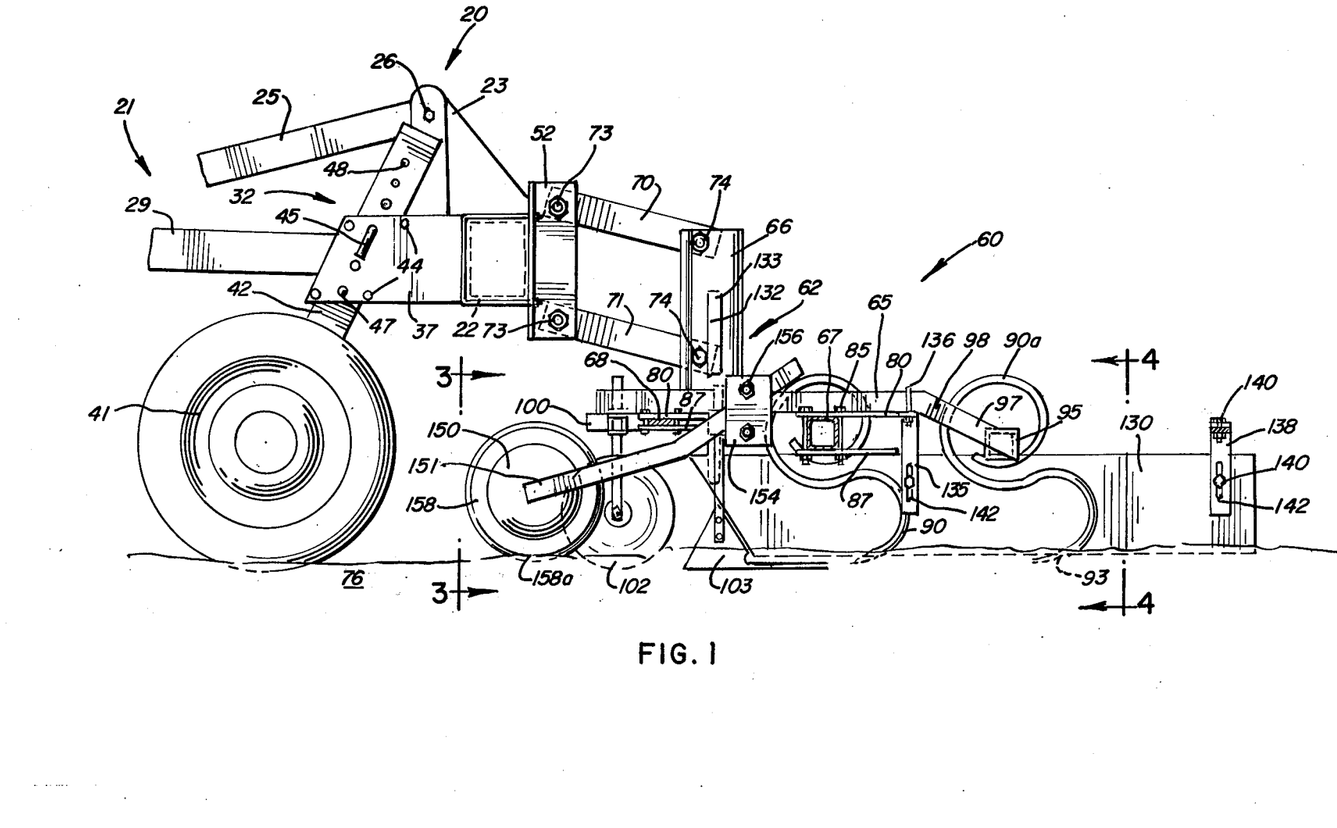
FIG. 1 is a side view of one embodiment of a floating row-crop cultivator constructed in accordance with the invention.
Figure 2:
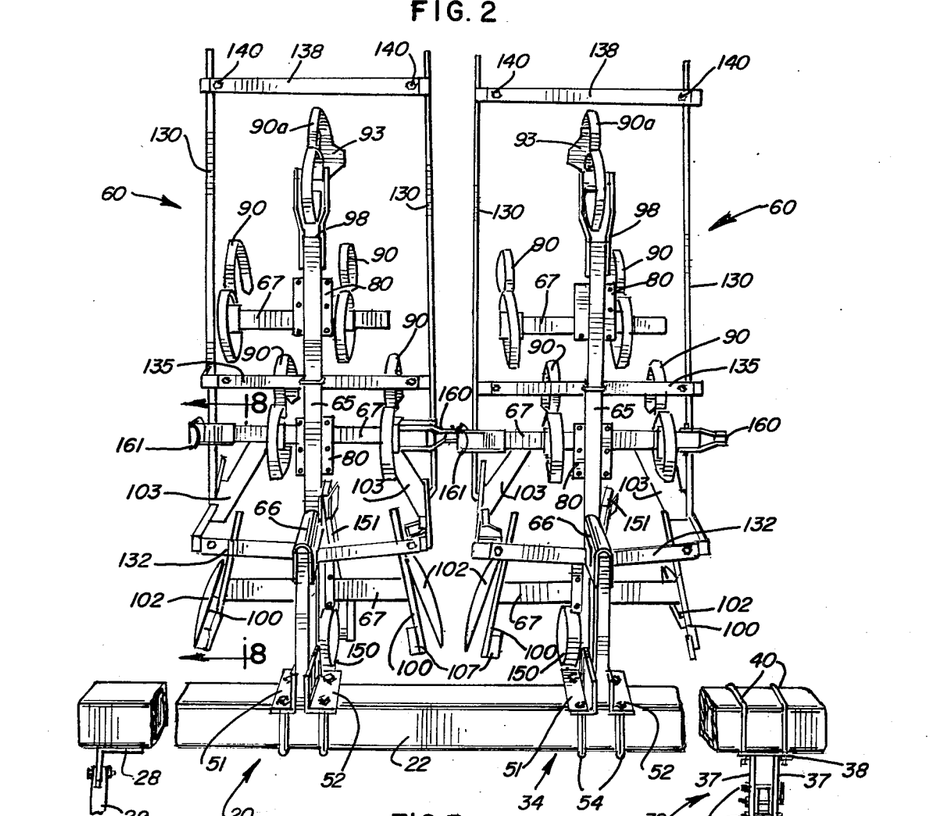
FIG. 2 is a top view of a floating row-crop cultivator similar to that illustrated in FIG. 1 showing two adjacent gang assemblies attached to the drawbar, but having additional spring tooth harrows.

It should be pointed out that the embodiments shown in FIGS. 1 and 2 are identical except for the fact that the embodiment in FIG. 2 has an additional row of spring tooth harrows. Regardless, the operation of the cultivator gang assembly illustrated in FIG. 1 and of that illustrated in FIG. 2 are substantially identical. Therefore, for purposes of brevity and clarity, no distinction will be made in the description herein between the two embodiments.

One form of an agricultural implement or floating row-crop cultivator constructed according to the invention is seen to include a drawbar assembly, generally designated 20, which is adapted to be secured to a prime mover, such as a tractor (not shown), via a conventional 3-point hitch partially shown and generally designated 21, so that the implement will be pulled over the ground. The drawbar assembly 20 includes a laterally extending square tube drawbar 22; bifurcated upright bracket 23 secured to the center portion of the drawbar 22 to which the top link 25 of the 3-point hitch is pivotally connected by a bolt 26; a pair of forwardly-extending, L-shaped brackets, one of which is shown and designated 28, secured to the drawbar 22 on either side of the upright bracket 23 to which are pivotally connected the respective pull arms of the 3-point hitch, one of which is shown and designated 29; bifurcated forwardly extending bracket assemblies, generally designated 32, carried on each side of the drawbar 22 laterally outward of the pull arm bracket; and, a plurality of rearwardly extending bracket assemblies, each generally designated 34, secured to the drawbar 22 and adapted to provide a connection for the cultivating gang assemblies.

The bracket assembly 32 includes a pair of opposed spaced plates 37 and a back plate 38 which is adjustably secured to the drawbar 22 by a pair of U-bolts 40 which are wrapped around the drawbar 22. A transport wheel 41 is rotatably mounted at the lower end of wheel support member 42 which extends upwardly between the spaced plates 37. The attitude of the wheel support member 42 is defined by four bolts 44 extending between the plates 37. The vertical position of the wheel 41 may be adjusted by removing a positioning bolt 45, aligning the respective apertures 47 and 48 formed in the spaced plates 37 and the wheel support member 42 and reinserting the positioning bolt 45.

The bracket assembly 34 includes a pair of opposed, spaced, L-shaped brackets 51 and 52, each of which is adjustably secured to the drawbar 22 by a U-bolt 54 which is wrapped around the drawbar 22.

Rearwardly of the drawbar assembly 20 are a plurality of laterally adjacent cultivating gang assemblies, each designated 60, which will be towed in a forward direction when the tractor is driven. For purposes of brevity and clarity, in FIGS. 2-7, only two such gang assemblies 60 are shown; however, ten or more such gang assemblies 60 are employed in agricultural applications to increase efficiency of the implement during each pass through the fields. Because of the large scale operations present in agriculture, the size of the implements utilized can be increased in size so that the speed of agricultural operations such as cultivating can also be increased. The use of larger sized implements results in a reduction in the amount of time a given operation on a given size field can be accomplished. However, the increased size of the implement does create problems in moving the implement through fenced in areas and in towing the implement along a road to a point of use. Although not delineated in the drawings, it is possible to hinge the drawbar 22 so that the drawbar 22 and the gang assemblies 60 attached thereto may be vertically pivoted along a horizontal, longitudinal axis so that the implement may be folded to a transport position to enable the implement to pass through a narrow gate or be safely towed along the roadway.

Referring to FIG. 1, each cultivating gang 60 has a frame assembly, generally designated 62, and a plurality of ground engaging tools, described more fully below, carried by the frame assembly 62 which loosen or break up the soil between adjacent rows of crops. The frame assembly includes a tubular, main center member 65 positioned along a longitudinal axis parallel to the forward direction of travel; an upright, U-shaped bracket member 66; one or more tubular, cross members 67; and, a tool-supporting cross bar member 68.

The upright bracket member 66 is secured to the top surface of the center member 65, as by welding, and has a forward opening permitting insertion of links 70 and 71 therein. The links 70 and 71 are respectively pivotally secured at their forward ends between the opposed brackets 51 and 52 by bolts 73 and their rearward ends between the leg portions of the upright bracket member 66 by bolts 74. The brackets 51 and 52, the links 54 and 55 and the upright bracket member 66 define a parallelogram linkage assembly operatively connecting the cultivating gang assembly 60 with the drawbar assembly 20. This parallelogram linkage assembly permits the gang assembly 60 to move vertically, i.e., float, relative to the ground, designated 76, so that the gang assembly remains substantially parallel to the ground, while preventing one end of the gang assembly from moving vertical relative to the other end. This linkage assembly is relatively loose to eliminate the need for sophisticated anti-friction bearings.

The cross members 67 and crossbar 68 are adjustably clamped to the center member 65. Clamping plates 80 are fixed to the bottom surface of the center member 65, as by welding, and have a plurality of receiving apertures 83 through which seuring bolts 85 pass and engage an opposing clamping plate 87 spaced downwardly therefrom. The cross members 67 and crossbar 68 extend between their respective clamping plates 80 and 87 and are held in position by tightening of the bolts 85 which extend therebetween. The utilization of the clamping plates 80 and 87 permit the cross members to be shifted laterally or repositioned longitudinally relative to the center member 65 as desired.

The cross members 67 are provided to support spring tooth harrows 90 which are adjustably secured thereon by U-shaped clamps 91. Various configurations for spring tooth harrows are known and the specific construction of the spring tooth harrows 90 form no part of the invention herein. The clamps 91 are fixed to the cross members 67 by bolts 92 and may be constructed in a manner shown in my U.S. Pat. No. 3,827,505 issued Aug. 6, 1974, entitled "Mounting Clamp for Spring Tooth", which is hereby incorporated by reference. Any number of spring tooth harrows may be employed herewith and fixed in any selected position in accordance with the particular use intended. The rearmost spring tooth harrow 90a, which also includes a specialized soil-engaging, work-performing tool or chisel 93, is clamped to a short cross member 95 which is carried between the legs 97 of a bifurcated bracket 98 which is fixed to the rearward end of the center member 65.

The crossbar 68 is disposed adjacent the forward end of the center member 65 and extends transversely thereto laterally outward towards each side. Secured at each end of the crossbar 68 adjacent the lateral edges of the gang assembly is a mounting bar 100 which extends obliquely relative to the crossbar 68 from a forward position rearwardly and inwardly to a rearward position. Secured to the mounting bar 100 are ground-engaging, earthworking tools i.e., a ground-opening concave disc 102 and a weed cutter 103. The general configuration of the disc 102 and the weed cutter 103 are known in the art.

Figure 3:
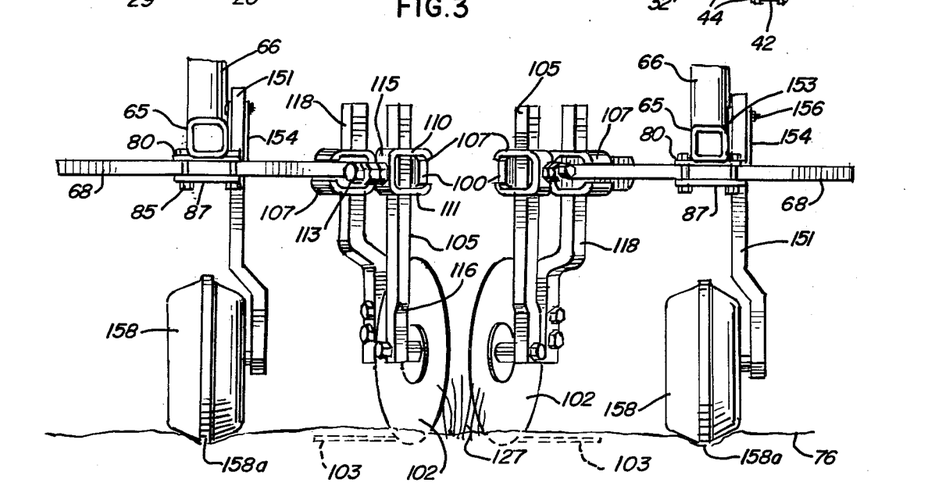
FIG. 3 is an enlarged, fragmentary, front view taken along line 3—3 of FIG. 1 illustrating the relative position of the ground opening discs of adjacent gang assemblies which flank a single row of crop.
Figure 5:
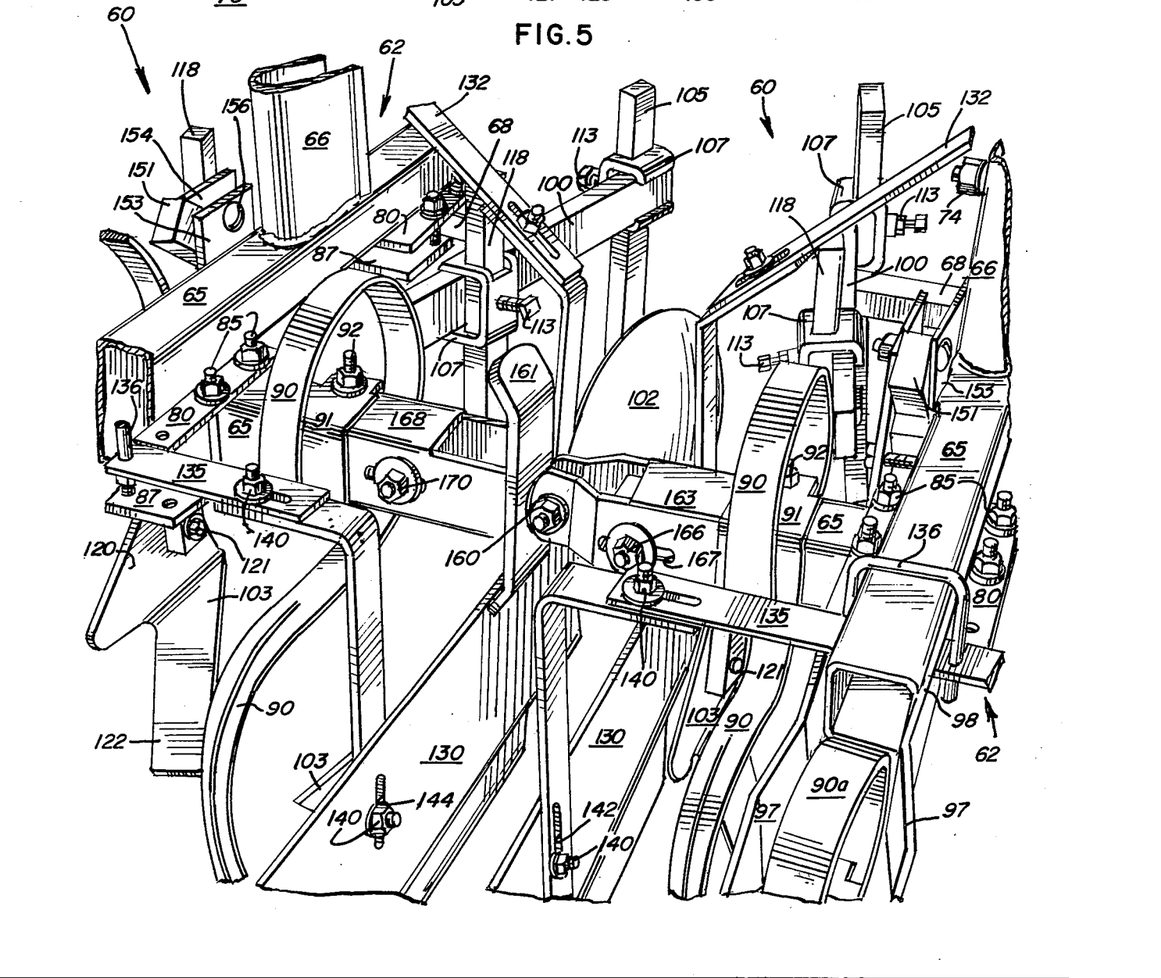
FIG. 5 is an enlarged, fragmentary, perspective view of portions of two adjacent gang assemblies as viewed from a position upwardly and rearwardly of the forward ends thereof and illustrating the cooperating vertical bearing plate and roller thereof.
Figure 6:
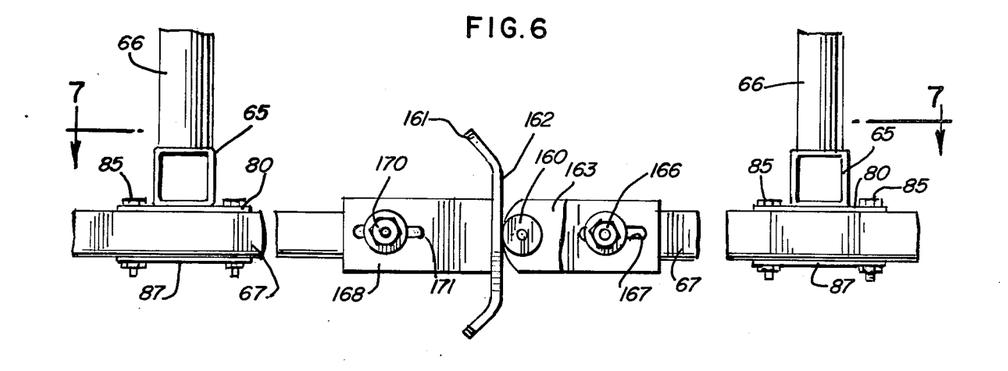
FIG. 6 is an enlarged, fragmentary, side view of the portions of two adjacent gang assemblies comprising the cooperating vertical bearing plate and roller assembly.
Figure 7:
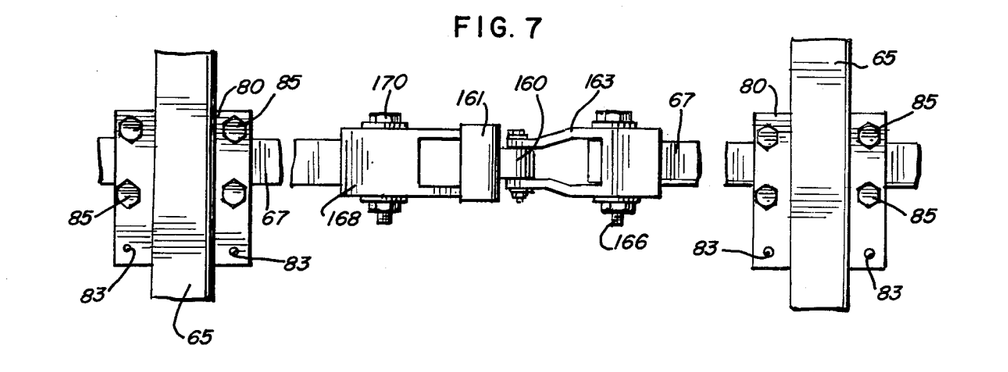
FIG. 7 is an enlarged, top view of the bearing plate and roller assembly taken along line 7—7 of FIG. 6.
Figure 8:
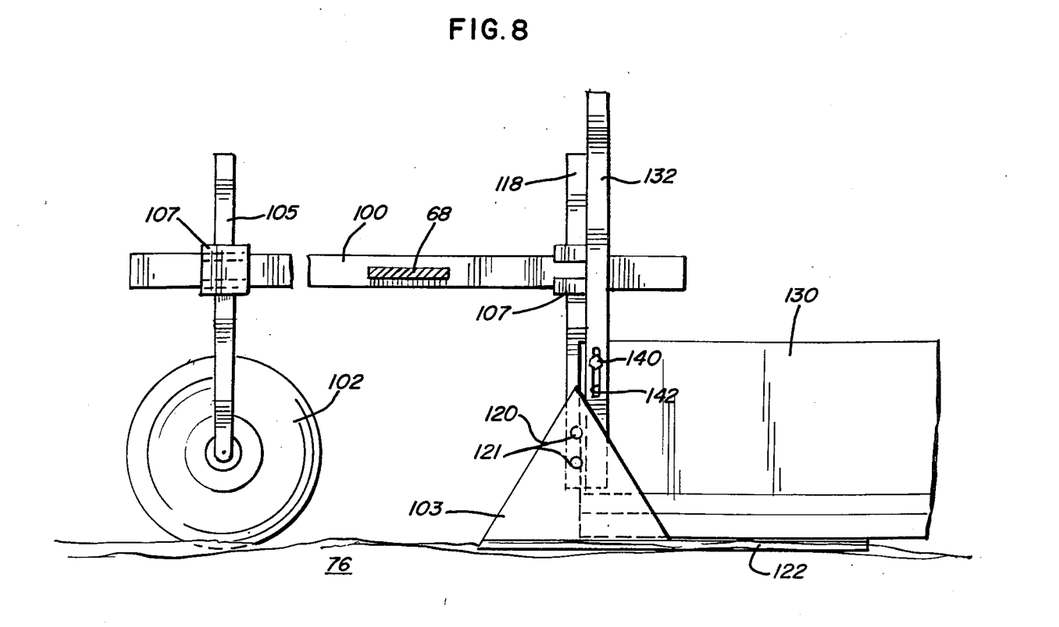
FIG. 8 is an enlarged, side view taken along line 8—8 of FIG. 2 particularly illustrating the arrangement of the disc, weed cutter and shield disposed at the forward end of a gang assembly at one lateral side thereof.

Referring to FIGS. 3 and 5 in particular, it can be seen that the disc 102 is journaled at the lower end of a shank member 105 which is clamped to the mounting bar 100 by a C-shaped clamping member 107 which is impaled on the mounting bar 100. The shank member 105 extends through respective apertures formed in the upper and lower portions 110 and 111 of the clamping member 107. The clamping member 107 is adjustably secured to the mounting bar 100 by a bolt 113 which extends through the back portion 115 of the clamping member 107 and engages the shank member 105. By tightening the bolt 113 against the shank member 105, the shank member 105 and the mounting bar 100 are fixedly secured together. The shank member 105 has a slight twist as seen at 116 so that when it is mounted in one position, the disc 102 will have a rotational plane tilted approximately 7° relative to the longitudinal axis of the gang assembly and when rotated 180°, the disc 102 will have a rotational plane tilted approximately 17°. The clamping member 107 permits both height adjustment of the disc 102 as well as lateral adjustment along the mounting bar 100. Because the mounting bar 100 is oblique to the direction of travel, movement of the shank member 105 along the mounting bar 100 adjusts both the lateral position and the longitudinal position of the disc 102.

Figure 4:
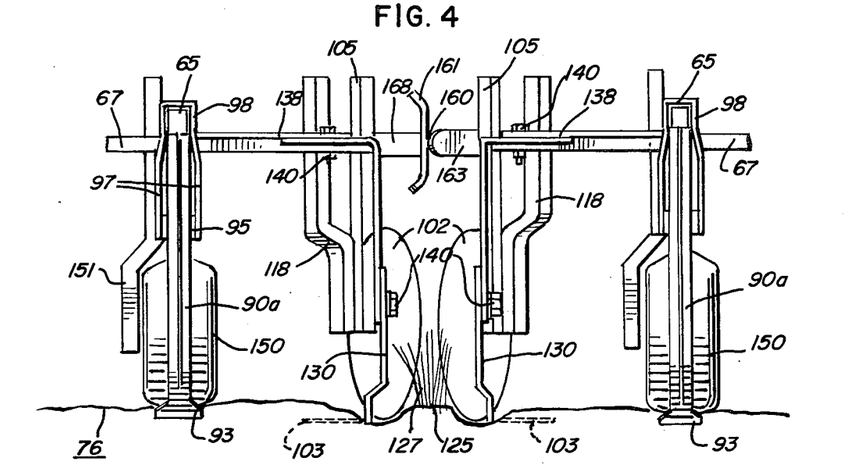
FIG. 4 is an enlarged fragmentary, rear view taken along line 4—4 of FIG. 1 with parts broken away and showing generally the configuration of the uncultivated block of soil around the crop row after the discs, weed cutters and spring tooth harrows of adjacent gang assemblies have cultivated the ground on either lateral side of the row.

The weed cutters 103 are also secured to the mounting bar 100 by an offset shank member 118. The offset shank member 118 is secured to the mounting bar 100 in a manner similar to that which the disc shank member 105 is secured. As best seen in FIGS. 1 and 2, the weed cutter 103 is disposed rearwardly of the disc 102 and includes a generally triangular vertical portion 120 fixed to the shank member 118 by bolts 121 and a swept back horizontal cutting portion 122. The horizontal portion 122 extends generally inward from the lateral side of the gang assembly 60. When the row-crop cultivator is operated, the horizontal portion 122 travels slightly beneath the top surface of the ground approximately at the level of the disc 102 to separate the top surface from the remainder of the ground. The vertical portion 120 merges with the horizontal portion 122 at a curved corner 123 such that soil on the inside of the weed cutter is pushed away from the crop row so as to define an uncultivated row block 125 from which the plants 127 extend as shown in FIG. 4. The block 125 will be flanked by grooves left by the discs 102 and weed cutters 103 and generally lie above the level of the cultivated ground 76.

Rearwardly of each disc 102 and cooperating with each weed cutter 103 at the outer side thereof are upright shields 130 which extend longitudinally rearward along each lateral side of each gang assembly 60 beyond the rearwardmost spring tooth harrow 90a. The shields 130 are mounted by segmented strut members 132 which are connected between the upright bracket member 66 by bolts 133 and the forward portion of each shield 130. Another segmented strut member 135 transverse to the center member 65 is fixed to the center member 65 by a U-bolt 136 and is connected to each of the shields 130. Connected between the respective rearward end portions of the shields 130 is a final segmented strut member 138 which acts to stabilize the relative horizontal position thereof. The vertical position and lateral position of the shields 130 can be adjusted by loosening the connecting bolts 140 which extend through elongate slots 142 formed in the respective segments of the strut member 132, 135 and 138 and through elongate slots 144 formed in the respective shields 130. The shields 130 prevent soil loosened by the disc 102, weed cutters 103 and harrows 90 from being thrown onto the plants 127 as the implement is moved down the rows of crop.

A guide wheel 150 is carried at the lower end of a guide wheel support member 151 which is clamped between two vertical clamping plates 153 and 154 disposed on the lateral side of the center member 65. The clamping plate 153 is welded to the center member 65 in a manner similar to that of the clamping plates 80 and 87 which mount the cross members 67 and the crossbar 68. The vertical position of the guide wheel 150 can be adjusted by releasing bolts 156 extending between the respective clamping plates 153 and 154 and moving the guide wheel support 151 appropriately. The guide wheel 150 is journaled at the lower ends of the support member 151 and is provided with a single ribbed tire 158. The rib 158a follows a path defined by indentations formed when planting of the crop occurred.

When row-crops are planted a trough is formed in the ground by the tractor wheels and/or the planter wheels. Since the tractor and planter wheels are usually single ribbed, they form a groove which runs along a line which is parallel to the crop rows. Even when rain falls and causes the groove to be filled in, the groove remains, since the soil which fills in the groove is softer than the sides which define the groove. Hence, when the cultivator is operated to loosen and break up the soil between the crop rows, the tractor wheels and cultivator wheels will travel along the grooves to maintain the tractor and the cultivator in proper alignment. By suitably adjusting the position of the gang assemblies 60 the guide wheels 150 will direct the gang assemblies 60 along the same lines as the crops were planted. The vertical position of the guide wheels 150 determine the cutting depth of the spring tooth harrows 90 as well as the discs 102 and weed cutters 103 when fixed to the mounting bar 100. Because of the parallelogram linkage connecting each gang assembly 60 to the drawbar 22, the relative cutting depths of the respective earthworking tools remains substantially the same.

Because of the loose pivotal connection between the gang assemblies 60 and the drawbar 22 effected by the links 70 and 71 which permit independent vertical movement thereof, there is a tendency for the gang assemblies 60 to move somewhat in a lateral direction relative to each other whenever an object, such as a rock or stump, is struck. However, this slop movement back and forth, which is caused by side thrust imparted when an object is struck is prevented by providing each of the gang assemblies 60 with a bearing assembly which interacts with a cooperating bearing assembly carried by an adjacent gang assembly. The bearing assembly permits relative vertical movement between adjacent gang assemblies so that each may follow the contour of the land, but does not permit relative lateral movement. Herein, each of the gang assemblies 60 is provided on the one side with a roller 160, while on the other side a plate 161 having a vertical bearing surface 162 is provided. The roller 160 is journaled between the respective leg portions of a bifurcated bracket 163. The bracket 163 has a tube-shaped inward portion which is impaled on the end of the cross member 67. A setting bolt 166 which extends through an elongate slot 167 and through the cross member 67 secures the roller bracket 163 to the cross member 67 and permits internal adjustment of the position thereof. Similarly, the bearing plate 161 is fixed at the outward end of a tube-shaped bracket 168 which is fixed at the opposite end of the cross member 67 by a setting bolt 170 extending through elongate slot 171. Hence, the lateral position of the roller or the vertical bearing surface can be adjusted by loosening the respective setting bolt 166 or 170, moving the bracket 163 or 167 along the cross member 67 and re-tightening the setting bolt 166 or 170. The cooperating bearing assemblies extend laterally outward from the sides of the respective gang assemblies to span the space therebetween through which the crop row will pass.

When a plurality of gang assemblies 60 are properly adjusted to provide cultivation of row crops planted at predetermined intervals, the respective rollers 150 and bearing plates 151 are adjusted so that they are abuttingly engaged to prevent relative lateral movement. When relative vertical movement occurs between adjacent gang assemblies the roller 160 will roll upwardly or downwardly on the bearing surface 162. A single gang assembly 60, while being above to move without substantial frictional resistance vertically independent of its respective laterally adjacent gang assemblies 60, cannot shift laterally to one side unless the remainder of the gang assemblies 60 disposed on that side is also shifted in the same lateral direction. Because of the weight of each gang assembly 60 and its engagement with the ground, it is relatively difficult for one gang assembly to shift laterally and cut through the row of crops.

During operation of the implement, the row-crop cultivator will be towed behind a tractor so that it travels in a forward direction with the respective gang assemblies 60 laterally positioned so that the crop rows pass between the adjacent gang assemblies, the discs 102, weed cutters 103 and shields 130 of adjacent gang assemblies flanking each row of crop. The rotating discs 102 penetrate the ground to define the block of soil which will remain uncultivated, with the weed cutters 103 and spring tooth harrows 90 operating to break up the ground, till the soil and cut weeds between the crop rows.

As the cultivator travels over the field, each gang assembly independently moves vertically relative to the ground without substantial resistance to follow the surface contour of the ground. However, each gang assembly is prevented from moving laterally relative to the remaining gang assemblies by the cooperating bearing means, i.e., the engaging roller and bearing plate. The weight of each gang assembly effects penetration of the ground by the ground engaging tools carried by each gang assembly.

While it is noted that lateral movement might be prevented by employing sophisticated bearing between the drawbar assembly and the gang assemblies, such a method would be prohibitively expensive.

Finally, the cultivating gang assemblies at the opposite ends of the drawbar 22 are modified such that the earthworking tools and shields laterally outward of their respective center members 65 are eliminated. Since there are no gang assemblies outward of the end gang assemblies, outward lateral movement is governed by the tolerance of the connecting linkages. Lateral movement is somewhat limited by the linkages so that the gang assembly cannot move across the entire space between the rows.

I claim:

1. A row-crop cultivator for tilling the soil between adjacent rows of crops adapted for connection to a prime mover for travel over the ground in a forward direction comprising a drawbar assembly operatively connected to the prime mover, a plurality of laterally adjacent cultivating gang assemblies adapted to till the soil between adjacent crop rows, and connecting means for coupling each gang assembly to said drawbar assembly so as to permit each gang assembly to travel on the ground under its own weight and move independently in a vertical direction relative to an adjacent gang assembly as the cultivator travels forwardly along the ground, each gang assembly including a frame assembly coupled to the drawbar assembly by said connecting means, guide means carried by said frame assembly for following a path defined in the ground indicating the direction of movement for the gang assembly between adjacent crop rows, earthworking tools carried by said frame assembly to loosen or break up the soil between adjacent crop rows with ground opening means positioned at opposite lateral sides of the gang assembly for penetrating the ground along a line generally adjacent the respective crop rows, the ground opening means at the respective opposing lateral sides of adjacent gang assemblies being spaced apart to flank the crop row which passes between the adjacent gang assemblies as the cultivator travels along the ground, the respective ground opening means separating a block of soil from which the crops grow from the surrounding ground, and cooperating bearing means carried by said frame assembly including a first bearing member adjacent one lateral side of the gang assembly and a second bearing member adjacent the opposite lateral side of the gang assembly, the first bearing member of one gang assembly being cooperatively engaged and in contact with the second bearing member of an adjacent gang assembly and said bearing members being configured such that engagement of the respective bearing members prevents relative lateral movement between adjacent gang assemblies and permits relative vertical movement therebetween, each gang assembly thereby being operative to till soil between adjacent crop rows and is free to float along the ground by the connecting means.

2. The cultivator of claim 1 wherein at least one member of said bearing means extends laterally outward from the gang assembly to at least partially span the space between an adjacent gang assembly through which the crop row passes and engage the cooperating bearing member carried by the adjacent gang assembly at its opposing lateral side.

3. The cultivator of claim 1 wherein said cooperating bearing means between adjacent gang assemblies is a bearing plate at one lateral side of one gang assembly having a vertical bearing surface and a roller at the opposing lateral side of the other adjacent gang assembly.

4. The cultivator of claim 3 further including means for adjustably mounting said gang assemblies on said drawbar assembly to permit said gang assemblies to be moved laterally on said drawbar assembly and enable operation of the cultivator between rows having different spacing, and means for adjustably mounting said cooperating bearing means to permit lateral positioning thereof in operative engagement when their respective gang assemblies are moved laterally.

5. The cultivator of claim 1 further including means for adjustably mounting said earthworking tools and said ground opening means to permit variable position thereof relative to each other and the crop rows.

6. The cultivator of claim 1 wherein the ground opening means comprises a disc.

7. The cultivator of claim 6 further including means for mounting said disc for rotation in a rotational plane slanted rearwardly and inwardly relative to the direction of travel of the cultivator.

8. The cultivator of claim 6 further including cutting means carried by said frame assembly rearwardly of each disc for separating the top layer of soil from the ground.

9. The cultivator of claim 8 wherein said cutting means is a weed cutter having a horizontal portion generally extending from a position behind said disc inwardly toward the center of the gang assembly.

10. The cultivator of claim 1 wherein said guide means is a wheel having a single rib which follows a groove previously defined between the crop rows.

11. The cultivator of claim 1 wherein said frame assembly includes a center member extending longitudinally from a forward position to a rearward position and one or more cross members secured transversely to said center member, said ground engaging tools being mounted on said members.

12. The cultivator of claim 11 wherein said connecting means includes a first bracket fixed to said center member, a second bracket fixed to said drawbar assembly, and one or more links pivotally connected between said first and second brackets.

13. The cultivator of claim 12 wherein said connecting means has two links defining a parallelogram linkage so that said gang assemblies move vertically relative to each other while remaining generally parallel to the contour of the ground.

14. The cultivator of claim 11 wherein a first cross member secured to the center member carries said ground opening means, said first cross member substantially spanning the lateral width of said gang assembly so as to position each ground opening means at said opposite sides of said gang assembly, and a second cross member secured to the center rearwardly of said first cross member carries additional tools for loosening and breaking up the soil between adjacent crop rows.

15. The cultivator of claim 14 wherein said first cross member has a mounting bar secured at each end adjacent the opposite lateral sides of said gang assembly, ground opening means being secured to each mounting bar.

16. The cultivator of claim 15 wherein each mounting bar is mounted to said first cross member transverse to the direction of travel of the cultivator, and further including means for adjustably securing ground opening means to each mounting bar to permit variable positioning thereof relative to each other and to the ground.

17. The cultivator of claim 16 wherein said ground opening means is a disc.

18. The cultivator of claim 17 further including a weed cutter secured to each mounting bar rearwardly of its respective disc.

19. The cultivator of claim 14 wherein said frame assembly includes a third cross member secured to said center member rearwardly of said second cross member, said second and third cross members carrying spring tooth harrows for engaging the ground to cultivate the ground between the crop rows.

20. The cultivator of claim 1 further including shield means carried by said frame assembly at the opposite lateral sides of each gang assembly rearward of said ground opening means for preventing soil from said earthworking tools from being thrown laterally outward from the gang assembly onto the crop rows passing between the adjacent gang assemblies as the cultivator travels along the ground.

21. A row-crop cultivator for tilling the soil between adjacent rows of crops adapted for connection to a prime mover for travel over the ground in a forward direction comprising a drawbar assembly operatively connected to the prime mover, a plurality of laterally adjacent cultivating gang assemblies adapted to till the soil between adjacent crop rows, and coupling means for connecting each gang assembly to said drawbar assembly so as to permit each gang assembly to travel on the ground under its own weight and move independently in a vertical direction relative to an adjacent gang assembly as the cultivator travels forwardly along the ground, each gang assembly including a frame assembly having a longitudinally extending center member coupled to said drawbar assembly by said connecting means and at least one cross member secured transversely to said center member, a guide wheel rotatably mounted on a wheel support carried by said frame assembly, said guide wheel adapted to follow a path defined in the ground between the crop rows to indicate the direction of movement for the gang assembly between adjacent crop rows, earthworking tools carried by said center member and said cross members to loosen or break up the soil between adjacent crop rows with ground opening discs disposed along the forward portion of the opposite lateral sides of the gang assembly for penetrating the ground along a line generally adjacent the crop row, the discs at the respective opposing lateral sides of adjacent gang assemblies being spaced apart to flank the crop row which passes between the adjacent gang assemblies as the cultivator travels along the ground, the respective ground opening means separating a block of soil from which the crops grow from the surrounding ground, weed cutters rearward of each disc having a generally horizontal cutting portion extending inwardly from the sides of the gang assembly below the surface of the ground to separate the top surface of the ground from the remainder and at least one spring tooth harrow disposed between the opposite lateral sides of the gang assembly for cultivating the ground therebetween, an upright shield carried by said frame assembly rearward of each disc extending longitudinally along each lateral side of the gang assembly to prevent soil loosed by said harrows from being thrown into the crop rows between adjacent gang assemblies, and bearing means carried by said frame assembly adjacent each lateral side of the gang assembly to abut corresponding cooperating bearing means carried by an adjacent gang assembly, said bearing means including a bearing plate at one side having a vertical surface facing the adjacent gang assembly and a rotatable member carried by the adjacent gang assembly adapted to roll along said vertical surface, at least one of said bearing plate and said rotatable member of adjacent gang assemblies extending laterally outward from its respective gang assembly to engage the other, each gang assembly thereby being operative to follow the contour of the ground and till the soil between adjacent crop rows, whereby said bearing means permits, without substantial frictional resistance, relative vertical movement between adjacent gang assemblies, but prevents relative lateral movement between adjacent gang assemblies because of the horizontal abutment of their respective cooperating bearing means.

22. A row-crop cultivator for tilling the soil between adjacent rows of crops adapted for connection to a prime mover for travel over the ground in a forward direction and including a drawbar operatively connected to the prime mover, a plurality of laterally adjacent gang assemblies adapted to secure ground tillage tools placeable between a pair of adjacent rows of an agricultural crop, and a linkage connected between each gang assembly and the drawbar permitting each gang assembly to independently move vertically relative to the ground as the cultivator moves forwardly along the ground, a gang assembly comprising:

a frame assembly to which the linkage is connected;

a guide wheel carried by said frame assembly adapted to follow a path defined in the ground between the crop rows;

each gang assembly having an upright plate extending to one side thereof and a roller extending to the other side thereof, said respective rollers and upright plates being laterally adjustably held in respective engagement for preventing lateral movement of any one gang assembly independently of the group of assemblies as a whole, said rollers being freely moveable vertically over said respective upright plates permitting relatively free vertical movement of each assembly relative to adjacent assemblies.

23. A row-crop cultivator for tilling the soil between adjacent rows of crops adapted for connection to a prime mover for travel over the ground in a forward direction comprising a drawbar assembly operatively connected to the prime mover, a plurality of laterally adjacent cultivating gang assemblies adapted to till the soil between adjacent crop rows, and connecting means for coupling each gang assembly to said drawbar assembly so as to permit each gang assembly to travel on the ground under its own weight and move independently in a vertical direction relative to an adjacent gang assembly as the cultivator travels forwardly along the ground, each gang assembly including a frame assembly coupled to the drawbar assembly by said connecting means, guide means carried by said frame assembly for following a path defined in the ground indicating the direction of movement for the gang assembly between adjacent crop rows, earthworking tools carried by said frame assembly to loosen or break up the soil between adjacent crop rows with ground opening means positioned at opposite lateral sides of the gang assembly for penetrating the ground along a line generally adjacent the respective crop rows, the ground opening means at the respective opposing lateral sides of adjacent gang assemblies being spaced apart to flank the crop row which passes between the adjacent gang assemblies as the cultivator travels along the ground, the respective ground opening means separating a block of soil from which the crops grow from the surrounding ground, and bearing means carried by said frame assembly adapted to abut corresponding cooperating bearing means carried by an adjacent gang assembly, said cooperating bearing means between adjacent gang assemblies including a bearing plate at one lateral side of one gang assembly having an upright bearing surface and a roller at the opposing lateral side of the other adjacent gang assembly in rolling engagement with said bearing plate, each gang assembly thereby being operative to till soil between adjacent crop rows and free to float along the ground by the connecting means, whereby said bearing means permits relative vertical movement between adjacent gang assemblies but prevents relative lateral movement because of the horizontal engagement of the respective cooperating bearing means.

24. The cultivator of claim 23 further including means for adjustably mounting said gang assemblies on said drawbar assembly to permit said gang assemblies to be moved laterally on said drawbar assembly and enable operation of the cultivator between rows having different spacing, and means for adjustably mounting said cooperating bearing means to permit lateral positioning thereof in operative engagement when their respective gang assemblies are moved laterally.

* * * * *